United States Patent
Shen et al.

(10) Patent No.: US 10,158,864 B2
(45) Date of Patent: Dec. 18, 2018

(54) METHOD, APPARATUS AND CODER FOR SELECTING OPTIMAL REFERENCE FRAME IN HEVC CODING

(71) Applicant: Alibaba Group Holding Limited, Grand Cayman (KY)

(72) Inventors: Cao Shen, Beijing (CN); Kaiyan Chu, Hangzhou (CN); Haohui Xu, Hangzhou (CN); Guibin Lu, Beijing (CN); Wenfei Jiang, Hangzhou (CN); Chang Zhou, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 248 days.

(21) Appl. No.: 15/074,822

(22) Filed: Mar. 18, 2016

(65) Prior Publication Data

US 2016/0277756 A1 Sep. 22, 2016

(30) Foreign Application Priority Data

Mar. 19, 2015 (CN) .......................... 2015 1 0122717

(51) Int. Cl.
| | | |
|---|---|---|
| H04N 19/10 | (2014.01) | |
| H04N 19/90 | (2014.01) | |
| H04N 19/176 | (2014.01) | |
| H04N 19/96 | (2014.01) | |
| H04N 19/105 | (2014.01) | |
| H04N 19/146 | (2014.01) | |
| H04N 19/187 | (2014.01) | |

(52) U.S. Cl.
CPC ......... *H04N 19/176* (2014.11); *H04N 19/105* (2014.11); *H04N 19/146* (2014.11); *H04N 19/187* (2014.11); *H04N 19/96* (2014.11)

(58) Field of Classification Search
CPC ............................. H04N 19/105; H04N 19/96
USPC ..................................................... 375/240.16
See application file for complete search history.

(56) References Cited

U.S. PATENT DOCUMENTS

| | | |
|---|---|---|
| 2007/0110156 A1 | 5/2007 | Ji et al. |
| 2013/0101029 A1 | 4/2013 | Srinivasan et al. |
| | (Continued) | |

FOREIGN PATENT DOCUMENTS

| | | |
|---|---|---|
| CN | 102055977 | 5/2011 |
| CN | 103813166 | 5/2014 |

OTHER PUBLICATIONS

PCT Search Report and Written Opinion dated Jun. 10, 2016 for PCT Application No. PCT/US16/23250, 12 pages.

*Primary Examiner* — Jeffery A Williams
(74) *Attorney, Agent, or Firm* — Lee & Hayes, PC

(57) ABSTRACT

A method, an apparatus and a coder for selecting an optimal reference frame in HEVC coding are disclosed. The method includes obtaining optimal reference frames of prediction units spatially adjacent to a current prediction unit, and determining an optimal reference frame of the current prediction unit based on a correlation between optimal reference frames of the spatially adjacent prediction units in a same layer depth for prediction unit(s) of a minimum layer depth. In this way, an ergodic rate distortion cost calculation is not needed to be performed at least for the prediction unit(s) of the minimum layer depth, and the corresponding optimal reference frame is directly determined using the correlation, thus reducing the amount of calculations and enhancing the coding efficiency.

17 Claims, 8 Drawing Sheets

(56) References Cited

U.S. PATENT DOCUMENTS

| | | |
|---|---|---|
| 2014/0056356 A1 | 2/2014 | Yu et al. |
| 2014/0092978 A1* | 4/2014 | Bugdayci ............ H04N 19/513 375/240.16 |
| 2014/0140399 A1 | 5/2014 | Seregin et al. |
| 2014/0198846 A1 | 7/2014 | Guo et al. |
| 2015/0016516 A1 | 1/2015 | Saxena et al. |
| 2015/0189272 A1 | 7/2015 | Peng et al. |
| 2016/0080745 A1 | 3/2016 | Kwak et al. |

* cited by examiner

CODER 800

APPARATUS FOR SELECTING AN OPTIMAL REFERENCE FRAME IN HEVC CODING 801

FIG. 8

METHOD, APPARATUS AND CODER FOR SELECTING OPTIMAL REFERENCE FRAME IN HEVC CODING

CROSS REFERENCE TO RELATED PATENT APPLICATION

This application claims foreign priority to Chinese Patent Application No. 201510122717.8 filed on Mar. 19, 2015, entitled "Method, Apparatus and Coder for Selecting an Optimal Reference Frame in HEVC Coding", which is hereby incorporated by reference in its entirety.

TECHNICAL FIELD

The present disclosure relates to the field of video image processing, and in particular, to methods, apparatuses, and coders for selecting an optimal reference frame in HEVC (High Efficiency Video Coding) coding.

BACKGROUND

HEVC is a new generation of video coding standard, which adopts a flexible block structure division technology for encoding coded images. In HEVC, a block structure includes a coding unit (CU), a prediction unit (PU) and a transform unit (TU). The HEVC conducts coding using the CU as a basic coding unit during a coding process. An HEVC coder firstly divides a video image into a plurality of non-overlapping largest coding units (LCUs), and then divides the LCUs into smaller CUs according to a tree structure, with sizes of CUs ranging from the LCUs to smallest coding units (SCUs). Each CU includes one or more PUs, and each CU needs to perform an inter-frame prediction or an intra-frame prediction using a PU as a unit. A problem of selecting an optimal reference frame exists in a process of inter-frame prediction.

A method for selecting an optimal reference frame in a conventional process of PU inter-frame prediction includes predicting all candidate reference frames one by one for a current PU, individually calculating a rate distortion cost corresponding to each candidate reference frame, and selecting a candidate reference frame having the minimum rate distortion cost as the optimal reference frame for the current PU. Such an ergodic selection method has a very large amount of computation. In addition, because one LCU may be divided into a plurality of CUs and one CU may have multiple inter-frame prediction division modes, each CU of an inter-frame prediction division mode includes one or more PUs. As each PU corresponding to each inter-frame prediction division mode of each CU needs to traverse all candidate reference frames in order to select a corresponding optimal reference frame, this incurs a large amount of computation and a long time on a coding process, thereby seriously affecting the coding efficiency.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

A technical problem to be solved by the present disclosure is to provide a method for selecting an optimal reference frame in HEVC coding, which is used to solve a technical problem of a large computation cost and a long computation time in existing technologies that affect a coding efficiency due to a need of individual testing of candidate reference frames in a ergodic manner.

The present disclosure further provides an apparatus and a coder for selecting an optimal reference frame in HEVC coding, which are used to ensure implementations and applications of the foregoing method in practice.

According to an aspect of the present disclosure, a method for selecting an optimal reference frame in HEVC coding is provided. In implementations, the method may include at least obtaining optimal reference frames of prediction units that are spatially adjacent to a current prediction unit, and determining an optimal reference frame of the current prediction unit based on a correlation between optimal reference frames of prediction units that are spatially adjacent in a same layer depth for prediction unit(s) that is/are in a minimum layer depth.

In implementations, for prediction unit(s) that is/are not in the minimum layer depth, the method may include obtaining optimal reference frames of prediction units that is spatially adjacent to a current prediction unit, and determining an optimal reference frame of the current prediction unit based on a correlation between optimal reference frames of prediction units that are spatially adjacent in a same layer depth.

In implementations, determining the optimal reference frame of the current prediction unit based on the correlation between the optimal reference frames of the prediction units that are spatially adjacent in the same layer depth may include determining the optimal reference frame corresponding to the current prediction unit from the optimal reference frames that are obtained according to a strategy that the optimal reference frames of the prediction units that are spatially adjacent in the same layer depth are the same.

In implementations, determining the optimal reference frame of the current prediction unit based on the correlation between the optimal reference frames of the prediction units that are spatially adjacent in the same layer depth includes determining whether the optimal reference frames that are obtained are equal to each other, and determining equal optimal reference frames to be the optimal reference frame of the current prediction unit if affirmative.

In implementations, for the prediction unit(s) that is/are not in the minimum layer depth, the method may include obtaining optimal reference frames of prediction units that are located in an upper layer depth and have a spatial location that is equal and adjacent to the current prediction unit; or obtaining optimal reference frames of prediction units that are located in an upper layer depth and have a spatial location that is equal and/or adjacent to the current prediction unit, and obtaining the optimal reference frames of the prediction units that are spatially adjacent to the current prediction unit; and determining the optimal reference frame of the current prediction unit based on correlations between optimal reference frames of prediction units which spatial locations are equal and/or adjacent to each other in different layer depths.

In implementations, determining the optimal reference frame of the current prediction unit based on the correlations between the optimal reference frames of the prediction units which spatial locations are equal and/or adjacent to each other in the different layer depths may include determining the optimal reference frame of the current prediction unit from the optimal reference frames that are obtained according to a strategy that the optimal reference frames of the prediction units which spatial locations are equal and/or adjacent to each other in the different layer depths are the same.

In implementations, determining the optimal reference frame of the current prediction unit according to the correlations between the optimal reference frames of the prediction units which spatial locations are equal and/or adjacent to each other in the different layer depths may include determining whether all the obtained optimal reference frames are equal to each other; or determining whether all the obtained optimal reference frames are equal to each other and determining whether motions of the obtained predication units having the spatial location the same as the current prediction unit in the upper layer depth are not severe; and determining equal optimal reference frames to be the optimal reference frame of the current prediction unit if affirmative.

In implementations, obtaining the optimal reference frames of the prediction units that are spatially adjacent to the current prediction unit may include obtaining optimal reference frames of left and upper adjacent prediction units of the current prediction unit; or obtaining optimal reference frames of left adjacent, upper adjacent and upper-left adjacent prediction units of the current prediction unit; or obtaining optimal reference frames of left adjacent, upper adjacent and upper-right adjacent prediction units of the current prediction unit; or obtaining optimal reference frames of left adjacent, upper adjacent, upper-left adjacent and upper-right adjacent prediction units of the current prediction unit.

According to another aspect of the present disclosure, an apparatus for selecting an optimal reference frame in HEVC coding is provided. In implementations, the apparatus may include a first control unit to control a first acquisition unit and a first determination unit to at least perform corresponding processing for prediction unit(s) of a minimum layer depth.

The first acquisition unit is configured to obtain optimal reference frames of prediction units that are spatially adjacent to a current prediction unit.

The first determination unit is configured to determine an optimal reference frame of the current prediction unit based on a correlation between optimal reference frames of prediction units that are spatially adjacent in a same layer depth.

In implementations, the first control unit may be configured to control the first acquisition unit and the first determination unit to perform corresponding processing for prediction unit(s) of each layer depth.

In implementations, the first determination unit may be configured to determine the optimal reference frame corresponding to the current prediction unit from optimal reference frames that are obtained according to a strategy that the optimal reference frames of the prediction units that are spatially adjacent in the same layer depth are the same.

In implementations, the first determination unit may include a first judgment sub-unit to determine whether all the optimal reference frames that are obtained are equal to each other and trigger a first determination sub-unit if affirmative; and the first determination sub-unit to determine the optimal reference frames that are equal to each other as the optimal reference frame of the current prediction unit.

In implementations, the first control unit may be configured to control the first acquisition unit and the first determination unit to perform corresponding processing for the prediction unit(s) of the minimum layer depth. The apparatus may further include a second control unit to control a second acquisition unit and a second determination unit to perform corresponding processing for prediction unit(s) that is/are not of the minimum layer depth.

In implementations, the second acquisition unit may obtain optimal reference frames of prediction units that are located in an upper layer depth and have a spatial location that is equal and adjacent to the current prediction unit; or obtain optimal reference frames of prediction units that are located in an upper layer depth and have a spatial location that is equal and/or adjacent to the current prediction unit, and obtain the optimal reference frames of the prediction units that are spatially adjacent to the current prediction unit.

The second determination unit may determine the optimal reference frame of the current prediction unit based on correlations between optimal reference frames of prediction units which spatial locations are equal and/or adjacent to each other in different layer depths.

In implementations, the second determination unit may determine the optimal reference frame of the current prediction unit from the optimal reference frames that are obtained according to a strategy that the optimal reference frames of the prediction units which spatial locations are equal and/or adjacent to each other in the different layer depths are the same.

In implementations, the second determination unit may include a second judgment sub-unit and a second determination sub-unit. The second judgment sub-unit may determine whether all the obtained optimal reference frames are equal to each other, or determine whether all the obtained optimal reference frames are equal to each other and whether motions of the obtained predication units having the spatial location the same as the current prediction unit in the upper layer depth are not severe. The second judgment sub-unit may trigger a second determination sub-unit if affirmative. The second determination sub-unit may determine the optimal reference frames that are equal to each other as the optimal reference frame of the current prediction unit.

In implementations, the first acquisition unit may obtain optimal reference frames of left and upper adjacent prediction units of the current prediction unit.

Alternatively, the first acquisition unit may obtain optimal reference frames of left adjacent, upper adjacent and upper-left adjacent prediction units of the current prediction unit.

Alternatively, the first acquisition unit may obtain optimal reference frames of left adjacent, upper adjacent and upper-right adjacent prediction units of the current prediction unit.

Alternatively, the first acquisition unit may obtain optimal reference frames of left adjacent, upper adjacent, upper-left adjacent and upper-right adjacent prediction units of the current prediction unit.

According to another aspect of the present disclosure, the present disclosure provides a coder. In implementations, the coder may include the foregoing apparatus of selecting an optimal reference frame in HEVC coding.

As compared with existing technologies, the present disclosure has the following beneficial effects.

At least for prediction unit(s) in a layer corresponding to the minimum coding layer depth, the present disclosure is able to directly determine an optimal reference frame of a prediction unit in at least one layer based on a correlation between optimal reference frames of prediction units that are spatially adjacent in a same layer depth. Therefore, at least for the prediction unit(s) in the layer corresponding to the minimum layer depth, performing an ergodic rate distortion cost calculation for all corresponding candidate reference frames thereof is not needed, which can save a corresponding computation cost of at least half of the prediction units, and improve the coding efficiency. Moreover, as the requirements for the quality of coded images become higher, the number of candidate reference frames increases. A larger amount of computation can be saved using the present disclosure.

BRIEF DESCRIPTION OF THE DRAWINGS

In order to describe the technical solutions of exemplary embodiments of the present disclosure more clearly, accompanying drawings used for describing the embodiments are briefly described herein. Apparently, the accompanying drawings merely represent a few embodiments of the present disclosure. One of ordinary skill in the art may still derive other drawings from these accompanying drawings without contributing any creative effort.

FIG. 8 is a structural diagram illustrating a coder according to the present disclosure.

DETAILED DESCRIPTION

Figure 1:
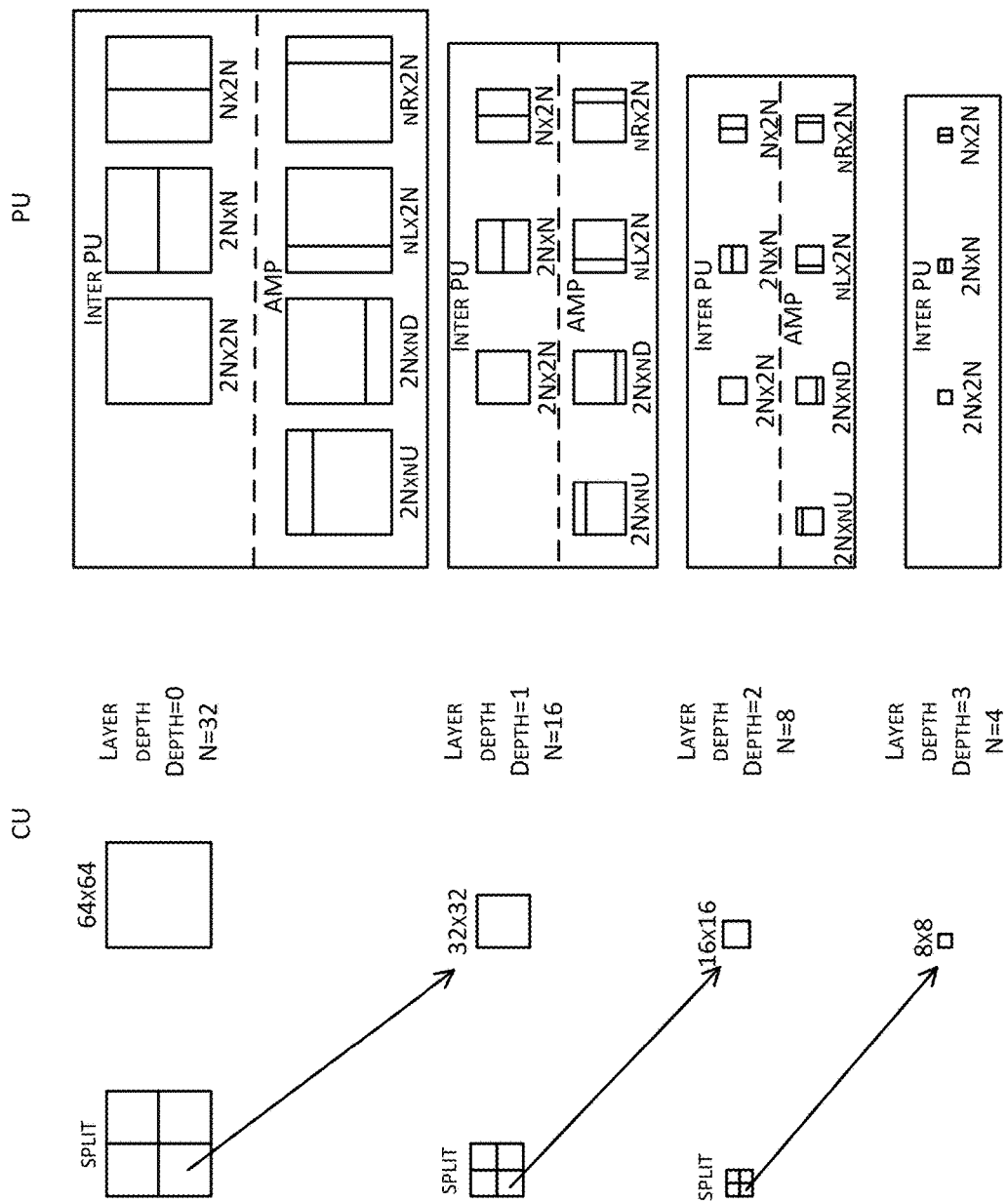
FIG. 1 is a schematic diagram illustrating a CU recursive division mode and a number of inter-frame prediction division modes and corresponding PUs thereof in HEVC coding in existing technologies.

The technical solutions of the embodiments of the present disclosure are described clearly and completely herein with reference to the accompanying drawings of the embodiments of the present disclosure. Apparently, the described embodiments merely represent a part of, and not all of, the embodiments of the present disclosure. Based on the embodiments in the present disclosure, all other embodiments derived by one of ordinary skill in the art without making any creative effort shall fall within the scope of protection of the present disclosure.

The present disclosure is applicable in a variety of universal or dedicated computing system environments or configurations. Examples include personal computers, server computers, handheld devices or portable devices, tablet devices, multiprocessor systems, and distributed computing environments that include any of the above systems or devices, etc.

The present disclosure may be described in a general context of computer executable instructions executed by a computing device, such as program module(s). In general, the program module(s) may include routines, procedures, objects, components, data structures, etc., that perform specific tasks or implement specific abstract data types. The present disclosure can also be implemented in distributed computing environments, and a task may be performed by a remote processing device connected through a communication network in these distributed computing environments. In a distributed computing environment, the program module(s) may be located in local and remote computer storage media which include storage device(s).

In order to facilitate explanation and illustration of the technical solutions of the present disclosure, some basic technical knowledge of the HEVC coding is first briefly described herein.

Under normal circumstances, a video image is first divided into multiple non-overlapping largest coding units (LCUs) in a HEVC coding process. The LCUs are then divided into smaller CUs according to a tree structure with sizes of the CUs ranging from the LCUs to the smallest coding units (SCUs). Each coding unit has a plurality of inter-frame prediction division modes, and each inter-frame prediction division mode consists of one or more prediction units. Each prediction unit corresponds to a plurality of candidate reference frames. By traversing the plurality of candidate reference frames corresponding to each prediction unit, each inter-frame prediction division mode is traversed. An optimal reference frame corresponding to each prediction unit and an optimal inter-frame prediction division mode are determined according to a principle of a minimum rate distortion cost, thus achieving an optimal prediction. A residual signal is obtained from a difference between a predicted signal and an original signal. The residual signal is transformed, quantized, entropy coded, and added with other prediction information and additional code flow information to form a final coding stream. A most important section in a process of determining an optimal inter-frame prediction division mode corresponding to a CU is to determine an optimal reference frame corresponding to each PU of the CU in each type of inter-frame prediction division mode.

FIG. 1, which shows a schematic diagram of a CU recursive division mode, inter-frame prediction division modes and corresponding PUs in a HEVC coding, is used as an example for explaining and illustrating a relationship among a CU and an inter-frame prediction division mode thereof and corresponding PU(s).

In FIG. 1, the largest coding unit LCU is 64×64, and the smallest coding unit SCU is 8×8. First, a single LCU of 64×64 may be divided into four CUs of 32×32. Each CU of 32×32 may be further divided into four CUs of 16×16, and each CU of 16×16 may be further divided into four SCUs of 8×8. In an implementation process, a size of a CU is expressed as a power of two, i.e., a value of N in the figure, or may be described using a layer depth, Depth, with a layer depth of the largest coding unit LCU is zero, and a layer depth is increased by one after each division on such basis.

Respective inter-frame prediction division modes for CUs corresponding to each layer depth are different, as shown in the rightmost block of FIG. 1.

When a layer depth is less than 3 (0, 1, 2), each CU has seven inter-frame prediction division modes: inter 2N×2N, inter 2N×N, inter N×2N, inter 2N×nU, inter 2N×nD, inter nL×2N, and inter nR×2N. The inter 2N×2N contains one PU, and each of the remaining six division modes contains two PUs. Accordingly, a CU of a depth of less than 3 has a total of 13 PUs.

When a layer depth is equal to 3, each CU has three inter-frame prediction division modes: inter 2N×2N, inter 2N×N, and inter N×2N. The inter 2N×2N contains one PU, and each of the remaining two division modes contains two PUs. Accordingly, a CU of a depth of 3 has a total of 5 PUs.

It should be noted that some CUs may satisfy coding requirements only after being divided once in practical application scenarios. Therefore, a layer depth thereof is only the depth of a minimum layer. Some CUs may need to be divided for two or more times according to the coding requirements. For each CU, an optimal reference frame of each PU in each layer is determined in an ascending order of layer depths. In other words, the optimal reference frame corresponding to each PU in each layer depth is determined in an order of a layer depth being "0", a layer depth being "1", a layer depth being "2", and higher layer depth(s).

The solution of the existing technologies needs to calculate a rate distortion cost of each candidate reference frame for each prediction unit of each layer depth in an ergodic manner, and select a candidate reference frame having the minimum rate distortion cost as an optimal reference frame of a respective prediction unit. Such selection method has a high computation complexity and a large computation cost, which affect the coding efficiency.

From the perspective of layer depths, a technical solution of a first embodiment of the present disclosure no longer performs the ergodic rate distortion cost calculation of each candidate reference frame (typically, the number of candidate reference frames is greater than one) at least for prediction unit(s) in a layer corresponding to the minimum layer depth, and directly determines an optimal reference frame of a prediction unit through a correlation between optimal reference frames of prediction units that are spatially adjacent in a same layer. This saves a computation cost of at least half of prediction units, and may improve the coding efficiency. Moreover, as requirements for the quality of coded images become higher, the number of candidate reference frames increases. A larger amount of computation can then be saved using the present disclosure.

First Embodiment

Figure 2:
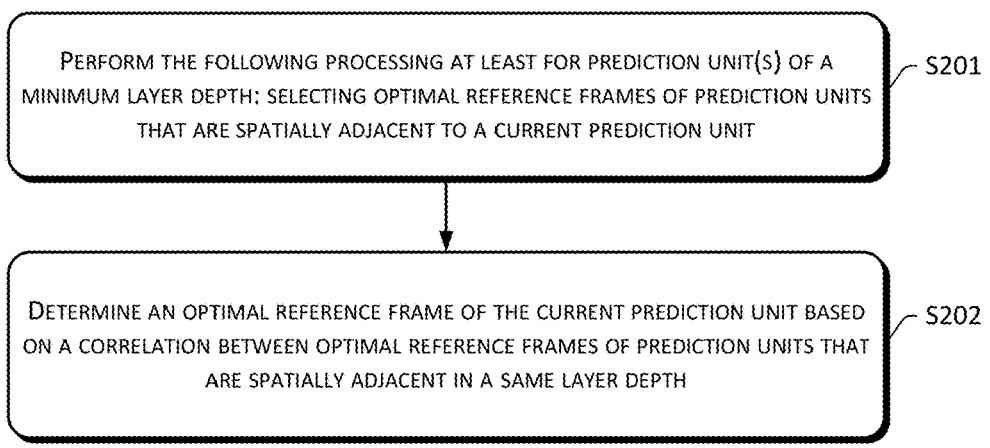
FIG. 2 is a flowchart illustrating a first method for selecting an optimal reference frame in HEVC coding according to the present disclosure.

With reference to FIG. 2, FIG. 2 is a flowchart illustrating a first example method 200 for selecting an optimal reference frame in HEVC coding according to the present disclosure. In implementations, the method 200 may include the following.

S201 performs the following processing at least for prediction unit(s) of a minimum layer depth: selecting optimal reference frames of prediction units that are spatially adjacent to a current prediction unit.

In order to determine an optimal reference frame of a current PU, optimal reference frames of PUs that are spatially adjacent to the current PU need to be obtained first. The PUs that are spatially adjacent to the current PU include at least left adjacent and upper adjacent PUs of the current PU, and may also include a PU that is upper-left adjacent to the current PU and/or a PU that is upper-right adjacent to the current PU. As a process of determining an optimal reference frame of a PU is performed in an order from left to right and from up to down, and the optimal reference frames of these PUs that are adjacent to the current PU have already been determined. Therefore, the optimal reference frames of these adjacent PUs can be taken as s data basis for determining the optimal reference frame of the current PU.

Figure 3:
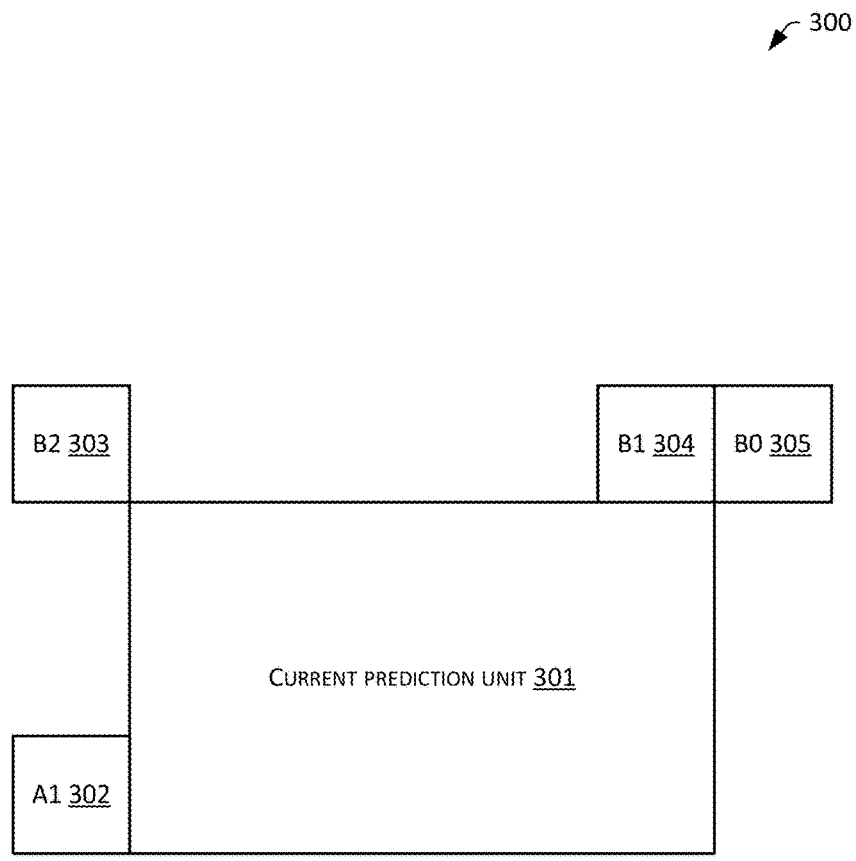
FIG. 3 is a schematic diagram illustrating a spatial adjacency relationship between PUs according to the present disclosure.

FIG. 3 is used herein as an example to provide a more intuitive description 300 for PUs that are spatially adjacent to a current PU 301. FIG. 3 shows a schematic diagram illustrating a spatial adjacency relationship 300 between PUs. In FIG. 3, a1 302 represents a left adjacent prediction unit, b2 303 represents an upper-left adjacent prediction unit, b1 304 represents an upper adjacent prediction unit, and b0 305 represents an upper-right adjacent prediction unit.

In an exemplary implementation, S201 may be implemented in the following four approaches, which respectively include:

a first approach: obtaining optimal reference frames of the left adjacent and upper adjacent prediction units of the current prediction unit;

a second approach: obtaining optimal reference frames of the left adjacent, upper adjacent and upper-left adjacent prediction units of the current prediction unit;

a third approach: obtaining optimal reference frames of the left adjacent, upper adjacent and upper-right adjacent prediction units of the current prediction unit; and a fourth approach: obtaining optimal reference frames of the left adjacent, upper adjacent, upper-left adjacent and upper-right adjacent prediction units of the current prediction unit.

S202 determines an optimal reference frame of the current prediction unit based on a correlation between optimal reference frames of prediction units that are spatially adjacent in a same layer depth.

In an exemplary implementation, an optimal reference frame of each PU in each layer needs to be successively determined in an order of small to large layer depths. What is emphasized in this embodiment is that at least prediction unit(s) of the minimum layer depth is/are processed in accordance with the above method blocks. In other words, when a PU of the minimum layer depth is processed, processing is performed directly according to S201 and S202 to determine an optimal reference frame of the PU, the essence of which is to determine the optimal reference frame of the instant PU according to a correlation between optimal reference frames of adjacent PUs. When a PU that is not in the minimum layer depth is processed, processing may be conducted in accordance with the above method blocks or other methods.

In an exemplary implementation, S202 may include determining the optimal reference frame of the current prediction unit from the obtained optimal reference frames according to a strategy that the optimal reference frames of the prediction units that are spatially adjacent in the same layer depth are the same.

In an exemplary implementation, S202 may include determining whether all the obtained optimal reference frames are equal to each other; and determining the optimal reference frames that are equal to each other as the optimal reference frame of the current prediction unit if affirmative.

If all the obtained optimal reference frames are not equal to each other, a reference frame having the minimum rate distortion cost may be determined as the optimal reference frame of the current PU using a conventional approach of performing an ergodic rate distortion cost calculation based on all the acquired obtained reference frames or all candidate reference frames.

At least for prediction unit(s) of a minimum layer depth, the present disclosure is able to directly determine an optimal reference frame of a current PU according to a correlation between optimal reference frames by using optimal reference frames of PUs that are adjacent to the current PU as a data basis. As such, performing an ergodic rate distortion cost calculation for the current PU is not needed, thus saving a large amount of data calculations.

For PU(s) that is/are not in the minimum layer depth, a number of ways may exist to determine an optimal reference frame thereof. For example, an optimal reference frame of a PU may be determined using a traditional method of ergodic rate distortion cost calculation, or using the above methods for processing PU(s) that is/are in the minimum layer depth.

In order to further improve the coding efficiency, the present disclosure further provides another technical solution.

Second Embodiment

Figure 4:
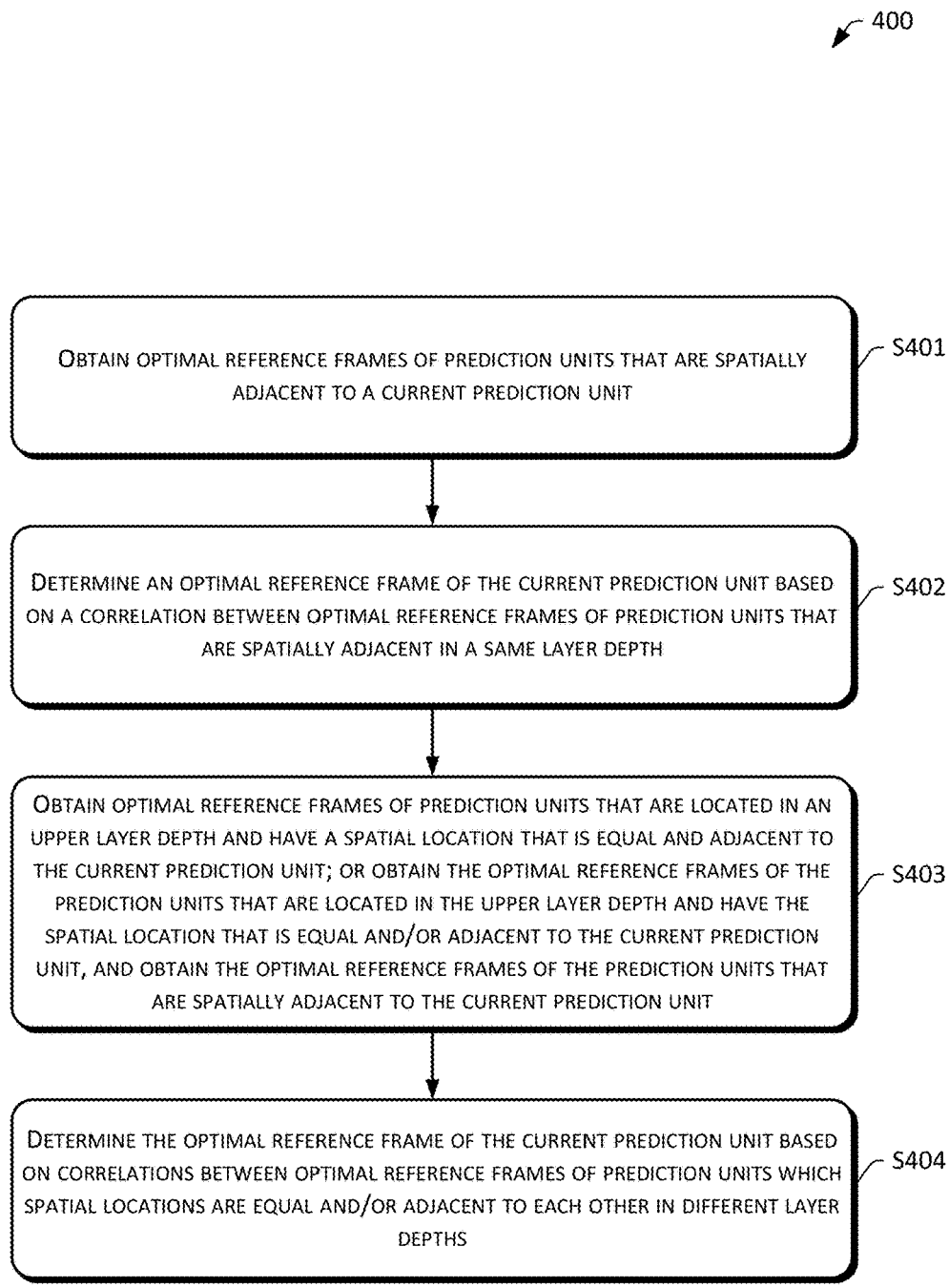
FIG. 4 is a flowchart illustrating a second method for selecting an optimal reference frame in HEVC coding according to the present disclosure.

FIG. 4 shows a schematic flowchart of a second example method 400 for selecting an optimal reference frame in HEVC coding according to the present disclosure. In implementations, the method 400 may process a layer that is of a minimum depth and a layer that is not of the minimum depth in different manners, and may include the following method blocks.

The following processes are performed for prediction unit(s) of a minimum layer depth in accordance with S201 and S202.

S401 obtains optimal reference frames of prediction units that are spatially adjacent to a current prediction unit.

S402 determines an optimal reference frame of the current prediction unit based on a correlation between optimal reference frames of prediction units that are spatially adjacent in a same layer depth.

Details of processing of prediction unit(s) of the minimum layer depth can be known by referring to relevant description of the first flowchart, and are not repeatedly described herein.

The following processes are performed for prediction unit(s) that is/are not in the minimum layer depth in accordance with S403 and S404.

S403 obtains optimal reference frames of prediction units that are located in an upper layer depth and have a spatial location that is equal and adjacent to the current prediction unit; or obtains the optimal reference frames of the prediction units that are located in the upper layer depth and have the spatial location that is equal and/or adjacent to the current prediction unit, and obtains the optimal reference frames of the prediction units that are spatially adjacent to the current prediction unit.

S404 determines the optimal reference frame of the current prediction unit based on correlations between optimal reference frames of prediction units which spatial locations are equal and/or adjacent to each other in different layer depths.

For a PU that is not in the minimum layer depth, an optimal reference frame of the instant PU may be directly determined based on a correlation between the optimal reference frames of the instant PU and PUs that are located in an upper layer depth and have a spatial location that is equal and adjacent to the instant PU. As such, performing an ergodic rate distortion cost calculation for the instant PU is not needed.

For a PU that is not in the minimum layer depth, an upper layer depth that is adjacent to the PU or is separated from the PU by a gap apparently exists. An upper layer depth may be an upper layer depth that is adjacent to a layer depth in which a current prediction unit is located or an upper layer depth that is separated from the layer depth in which the current prediction unit is located by a gap of two or more layers.

Figure 5:
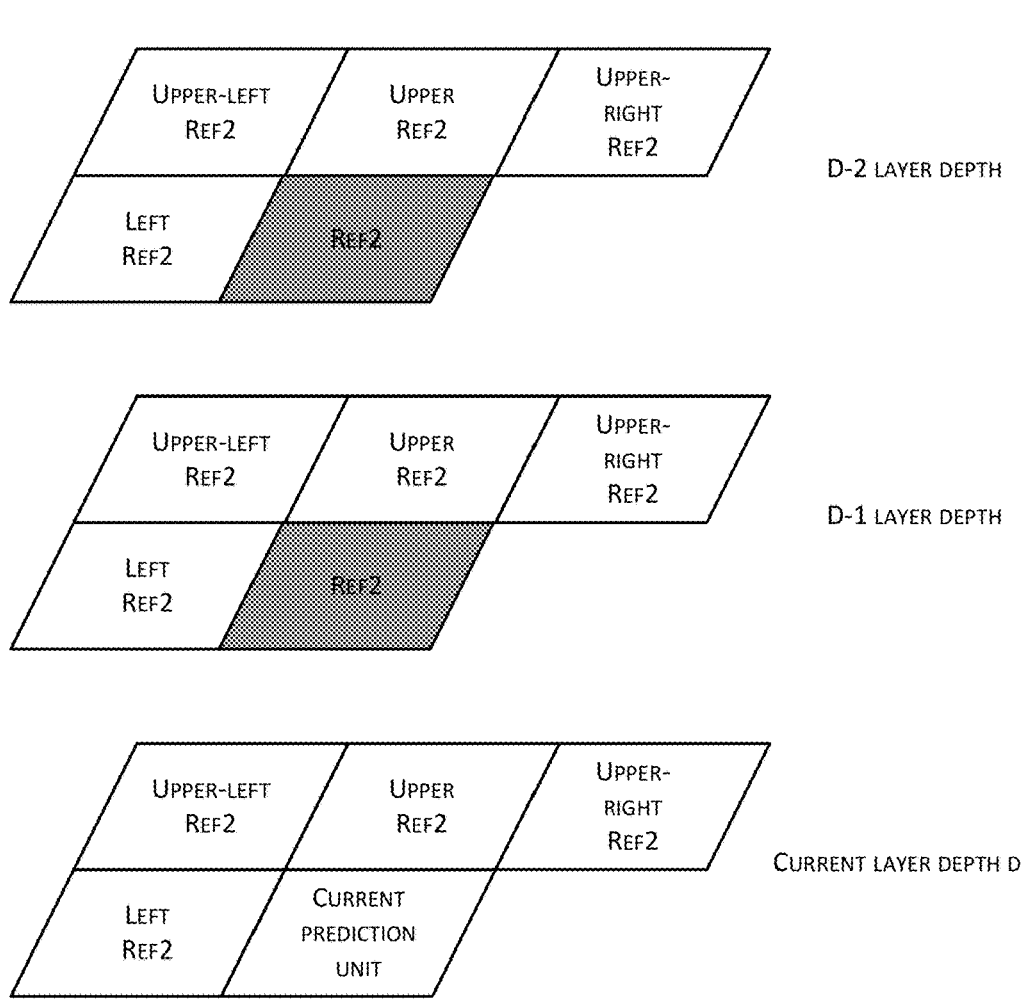
FIG. 5 is a schematic diagram illustrating an adjacent layer relationship of a layer depth in which a predication unit is located according to the present disclosure.

FIG. 5 shows a schematic diagram of an adjacent layer relationship 500 associated with a layer depth in which a predication unit is located. A current layer depth is d, and an upper layer depth may be d-1 layer depth or d-2 layer depth. Obtained optimal reference frames of PUs that are located in an upper layer depth and have a spatial location that is the same as a current PU are optimal reference frames of PUs that are marked in a gray color. Obtained optimal reference frames of PUs that are located in an upper layer depth and have a spatial location adjacent to a current PU are optimal reference frames of adjacent PUs of the PUs marked in the gray color. Since the optimal reference frames corresponding to all the PUs in the upper layer depth have been determined, the adjacent PUs in the upper layer depth may include PUs at any adjacent locations, such as upper-left adjacent, left adjacent, upper adjacent, and upper-right adjacent locations. In an exemplary implementation, an optimal reference frame of a single adjacent PU may be obtained. Alternatively, optimal reference frames of multiple adjacent PUs may be obtained.

For example, if a layer depth in which a current PU is located is two, this indicates that corresponding optimal reference frames have been determined for all PUs in an adjacent upper layer depth of one and a gapped upper layer depth of zero. If a layer depth in which a current PU is located is one, this indicates that corresponding optimal reference frames have been determined for all PUs having an upper layer depth of zero. By taking advantage of correlations between optimal reference frames of PUs of an adjacent layer depth or a gapped layer depth, the present embodiment determines an optimal reference frame corresponding to a current PU, thus saving a large amount of calculations.

In an exemplary implementation, S404 determines the optimal reference frame of the current prediction unit from the obtained optimal reference frames according to a strategy that optimal reference frames of prediction units which spatial locations are equal and/or adjacent to each other in different layer depths are the same.

In an exemplary implementation, S404 may include determining whether all the obtained optimal reference frames are equal to each other; determining that equal optimal reference frames as the optimal reference frame of the current prediction unit if affirmative; or individually performing a rate distortion cost calculation for all the obtained optimal reference frames or all candidate reference frames, and determining a reference frame having the minimum rate distortion cost as the optimal reference frame of the current prediction unit if not.

In an exemplary implementation, S404 may also include determining whether all the obtained optimal reference frames are equal to each other, and determining whether a motion of an obtained prediction unit that is located in the upper layer depth and has the spatial location that is the same as the current prediction unit are not severe; determining that equal optimal reference frames as the optimal reference frame of the current prediction unit if affirmative; or individually performing a rate distortion cost calculation for all the obtained optimal reference frames or all candidate reference frames, and determining a reference frame having the minimum rate distortion cost to be the optimal reference frame of the current prediction unit.

An example approach of determining whether the motion of the obtained prediction unit that is located in the upper layer depth and has the spatial location that is the same as the current prediction unit is not severe may include calculating a motion severe degree of the prediction unit that is located in the upper layer depth and has the spatial location that is the same as the current prediction unit, the motion severe degree being equal to a modulus value of a motion vector;

and determining whether the motion severe degree is less than a preset threshold, indicating that the motion is not severe if affirmative, and indicating that the motion is severe otherwise.

For example, if a motion vector of the prediction unit that has the same spatial location as the current prediction unit in the upper layer depth is mv, which includes mv_x in a direction X and mv_y in a direction Y, a motion severe degree mv_dist may be obtained by calculating according to an equation mv_dist=abs(mv_x)+abs(mv_y), where abs represents an absolute value calculation. After calculation, mv_dist is compared with a preset threshold. If mv_dist is less than the preset threshold, this indicates that a motion thereof is not severe. Otherwise, mv_dist indicates that the motion is severe.

As can be seen from the above process, a technical solution in this embodiment individually determines corresponding optimal reference frames for prediction unit(s) that is/are in a minimum layer depth and prediction unit(s) that is/are not in the minimum layer depth in accordance with different correlations, processing prediction units of different layer depths in accordance with different correlations. This type of correlation-based approach mainly employs optimal reference frames of adjacent prediction units in a same layer depth as a data basis, or uses optimal reference frames of prediction units having a same or adjacent location in an adjacent layer depth or a gapped layer depth as a data basis, to directly determine an optimal reference frame of a current prediction unit rather than performing an ergodic rate distortion cost calculation, thus further improving the efficiency of determining an optimal reference frame and hence improving the coding efficiency.

The methods of the present disclosure are described in detail above. Correspondingly, the present disclosure provides an apparatus for selecting an optimal reference frame in HEVC coding.

Third Embodiment

Figure 6:
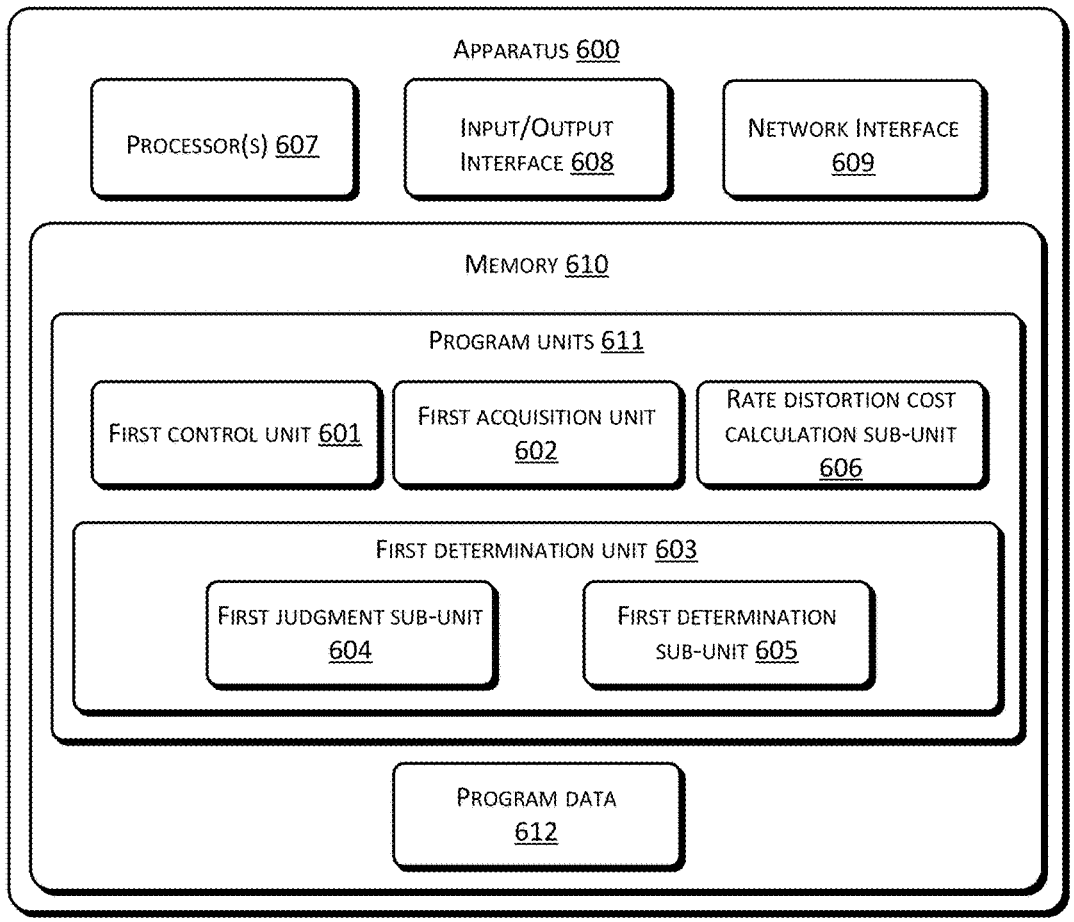
FIG. 6 is a structural diagram illustrating a first apparatus for selecting an optimal reference frame in HEVC coding according to the present disclosure.

FIG. 6 shows a structural diagram of a first example apparatus 600 for selecting an optimal reference frame in HEVC coding according to the present disclosure. As shown in FIG. 6, the apparatus 600 for selecting an optimal reference frame in HEVC coding may include a first control unit 601 that controls a first acquisition unit 602 and a first determination unit 603 to perform corresponding processing at least for prediction unit(s) that is/are in a minimum layer depth; the first acquisition unit 602 that obtains optimal reference frames of prediction units that are spatially adjacent to a current prediction unit; and the first determination unit 603 that determines an optimal reference frame of the current prediction unit based on a correlation between optimal reference frames of spatially adjacent prediction units in a same layer depth.

In an exemplary implementation, the first control unit 601 may control the first acquisition unit 602 and the first determination unit 603 to perform corresponding processing for the prediction unit(s) of the minimum layer depth.

In an exemplary implementation, the first control unit 601 may control the first acquisition unit 602 and the first determination unit 603 to perform corresponding processing for prediction unit(s) of each layer depth. In other words, the first control unit 301 may control the first acquisition unit 602 and the first determination unit 603 to perform corresponding processing for prediction unit(s) that is/are in the minimum layer depth and prediction unit(s) that is/are not in the minimum layer depth.

In an exemplary implementation, the first determination unit 603 may determine the optimal reference frame corresponding to the current prediction unit from the obtained optimal reference frames according to a strategy that the optimal reference frames of the spatially adjacent prediction units in the same layer depth are the same.

In an exemplary implementation, the first determination unit 603 may include a first judgment sub-unit 604 to determine whether all the acquired optimal reference frames are equal to each other, and trigger a first determination sub-unit 605 if affirmative; and the first determination sub-unit 605 to determine optimal reference frames that are equal to each other as the optimal reference frame of the current prediction unit.

In addition, if a determination of the first judgment sub-unit 604 is negative, a rate distortion cost calculation sub-unit 606 may be further triggered. In implementations, If a determination of the first judgment sub-unit 604 is negative, the rate distortion cost calculation sub-unit 606 may be triggered to perform rate distortion cost calculations for all the obtained optimal reference frames or all candidate reference frames individually, and determine a reference frame having the minimum rate distortion cost as the optimal reference frame of the current prediction unit.

In an exemplary implementation, the first acquisition unit 602 may obtain optimal reference frames of left adjacent and upper adjacent prediction units of the current prediction unit. Alternatively, the first acquisition unit 602 may obtain optimal reference frames of left adjacent, upper adjacent, and upper-left adjacent prediction units of the current prediction unit. Alternatively, the first acquisition unit 602 may obtain optimal reference frames of left adjacent, upper adjacent, and upper-right adjacent prediction units of the current prediction unit. Alternatively, the first acquisition unit 602 may obtain optimal reference frames of left adjacent, upper adjacent, upper-left adjacent, and upper-right adjacent prediction units of the current prediction unit.

In implementations, the apparatus 600 may include one or more computing devices. In implementations, the apparatus 600 may further include, but is not limited to, one or more processors 607, an input/output (I/O) interface 608, a network interface 609 and memory 610.

The memory 610 may include a form of computer-readable media, e.g., a non-permanent storage device, random-access memory (RAM) and/or a nonvolatile internal storage, such as read-only memory (ROM) or flash RAM. The memory 610 is an example of computer-readable media.

The computer-readable media may include a permanent or non-permanent type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer-readable media does not include transitory media, such as modulated data signals and carrier waves.

In implementations, the memory 610 may include program units 611 and program data 612. In implementations, the program units 611 may include one or more units and/or sub-units as described in the foregoing description.

Fourth Embodiment

Figure 7:
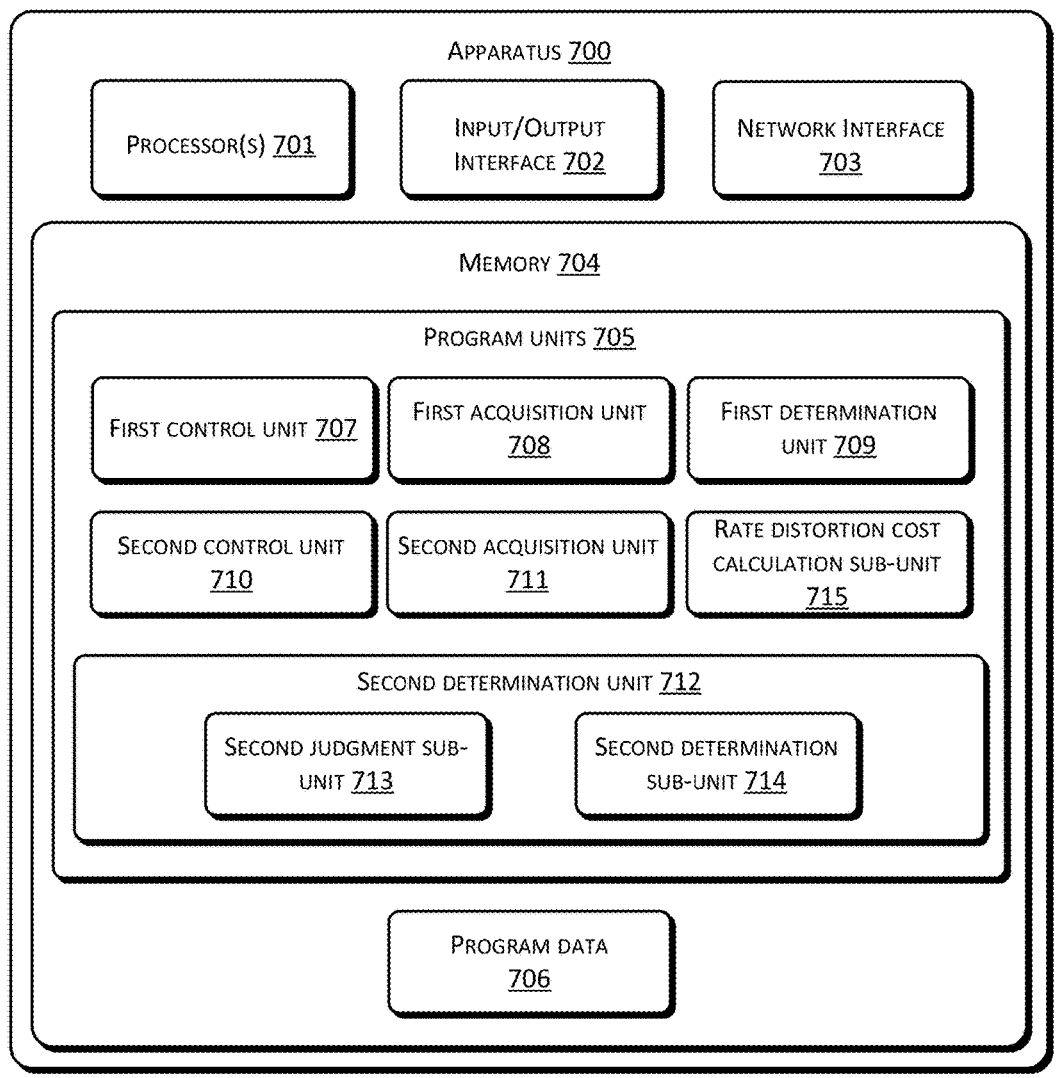
FIG. 7 is a structural diagram illustrating a second apparatus for selecting an optimal reference frame in HEVC coding according to the present disclosure.

FIG. 7 shows a structural diagram of a second example apparatus 700 for selecting an optimal reference frame in HEVC coding according to the present disclosure. As shown in FIG. 7, the apparatus 700 for selecting an optimal reference frame in HEVC coding may include one or more processors 701, an input/output (I/O) interface 702, a network interface 703 and memory 704.

The memory 704 may include a form of computer-readable media, e.g., a non-permanent storage device, random-access memory (RAM) and/or a nonvolatile internal storage, such as read-only memory (ROM) or flash RAM. The memory 704 is an example of computer-readable media.

In implementations, the memory 704 may include program units 705 and program data 706. In implementations, the program units 705 may include a first control unit 707 to control a first acquisition unit 708 and a first determination unit 709 to perform corresponding processing for prediction unit(s) that is/are in a minimum layer depth. The first acquisition unit 708 may obtain optimal reference frames of prediction units that are spatially adjacent to a current prediction unit. The first determination unit 709 may determine an optimal reference frame of the current prediction unit based on a correlation between optimal reference frames of spatially adjacent prediction units in a same layer depth. A second control unit 710 may control a second acquisition unit 711 and a second determination unit 712 to perform corresponding processing for prediction unit(s) that is/are not in the minimum layer depth. The second acquisition unit 711 may obtain optimal reference frames of respective prediction units having a spatial location the same as and adjacent to that of the current prediction unit in an upper layer depth, or obtain the optimal reference frames of the respective prediction units having a spatial location the same as and/or adjacent to that of the current prediction unit in the upper layer depth and obtain the optimal reference frames of the prediction units spatially adjacent to the current prediction unit. The second determination unit 712 may determine the optimal reference frame of the current prediction unit based on respective correlations between optimal reference frames of prediction units having the same and/or adjacent spatial location in different layer depths.

In an exemplary implementation, the second determination unit 712 may determine the optimal reference frame of the current prediction unit from the obtained optimal reference frames according to a strategy that the optimal reference frames of the prediction units having the same and/or adjacent spatial location in different layer depths are the same.

In an exemplary implementation, the second determination unit 712 may include a second judgment sub-unit 713 that determines whether all the obtained optimal reference frames are equal to each other, or determines whether all the obtained optimal reference frames are equal to each other and determines whether a motion of an obtained predication unit having the same spatial location as the current prediction unit in the upper layer depth is not severe. If affirmative, the second judgment sub-unit 713 may trigger a second determination sub-unit 714. The second determination sub-unit 714 may determine equal optimal reference frames as the optimal reference frame of the current prediction unit.

If a determination of the second judgment sub-unit 713 is negative, a rate distortion cost calculation sub-unit 715 may also be triggered, which individually performs a rate distortion cost calculation for all the obtained optimal reference frames or all candidate reference frames, and determines a reference frame having a minimum rate distortion cost to be the optimal reference frame of the current prediction unit.

Interactions among the above units can be found by referring to the foregoing method flowcharts, and thus are not repeatedly described herein.

FIG. 8 is a structural diagram of a coder 800 according to the present disclosure. As shown in FIG. 8, the coder 800 may include a built-in apparatus 801 for selecting an optimal reference frame in HEVC coding. A structure of the apparatus 801 for selecting an optimal reference frame in HEVC coding can be found by referring to the structure and description in FIG. 6 and FIG. 7, and thus is not repeatedly described herein.

In short, since the present disclosure determines a corresponding optimal reference frame at least for prediction unit(s) of a minimum layer depth based on a correlation between optimal reference frames of adjacent prediction units in a same layer depth, an optimal reference frame of a current prediction unit may be determined directly based on optimal reference frames of prediction units adjacent thereto when the prediction unit(s) of the minimum layer depth is processed. In this way, the rate distortion cost calculation is not needed, thereby simplifying a handling process and saving a processing time. In addition, the present disclosure may further determine a corresponding optimal reference frame for a prediction unit that is not in a minimum layer depth based on respective correlation(s) between optimal reference frames of prediction units having the same or adjacent spatial location in different layer depths, which can further reduce the amount of calculation and save the processing time, so as to improve the coding efficiency.

It should be noted that each embodiment in the present disclosure is described in a progressive manner. Each embodiment emphasizes on a portion that may be different from those of other embodiments. A portion that is similar or the same between embodiments can be found by making reference to each other. Due to basic similarities to the method embodiments, the description of the apparatus embodiments is relatively simple, and a related portion thereof can be found by referring to the description of the method embodiments.

Finally, it should be noted that relational terms described herein, such as "first" and "second", etc., are used solely to distinguish one entity or operation from another entity or operation without necessarily requiring or implying any existence of such relationship or ordering between these entities or operations in reality. Moreover, terms such as "comprise", "include" and any other variants thereof are intended to cover a non-exclusive inclusion. A process, method, product or device that includes a series of elements not only includes those elements, but also includes other elements that are not explicitly listed, or further includes elements that already existed in such process, method, product or device. In a condition without further limitations, an element defined by a phrase "include a/an . . . " does not exclude any other similar elements from existing in the process, method, product or device.

The methods, apparatuses, and the coder for selecting an optimal reference frame in HEVC coding according to the present disclosure are described in details above. Exemplary embodiments are used in the present disclosure illustrating the principles and implementations of the present disclosure.

The foregoing embodiments are merely used for facilitating the understanding of the methods of the present disclosure and corresponding core concepts. One of ordinary skill in the art may make changes to the exemplary implementations and scopes of application based on the concepts of the present disclosure. In view of the above, the content of the present disclosure should not be construed as a limitation to the present disclosure.

What is claimed is:

1. A method comprising:
obtaining optimal reference frames of a plurality of prediction units that are spatially adjacent to a first prediction unit that is located in a minimum layer depth;
determining whether the obtained optimal reference frames are equal to each other; and
determining the obtained optimal reference frames as an optimal reference frame of the first prediction unit without performing an ergodic rate distortion cost calculation if the obtained optimal reference frames are determined to be equal to each other.

2. The method of claim 1, comprising:
obtaining optimal reference frames of a second plurality of prediction units that are spatially adjacent to a second prediction unit that is not located in the minimum layer depth; and
determining an optimal reference frame of the second prediction unit based on the correlation between the optimal reference frames of the spatially adjacent prediction units in a same layer depth.

3. The method of claim 1, wherein determining the optimal reference frame of the first prediction unit comprises determining the optimal reference frame of the first prediction unit from the obtained optimal reference frames according to a strategy that the optimal reference frames of the spatially adjacent prediction units in the same layer depth are equal.

4. The method of claim 1, further comprising:
obtaining an optimal reference frame of a prediction unit having a spatial location equal to a spatial location of the first prediction unit in an upper layer depth and respective one or more optimal reference frames of one or more prediction units having spatial locations adjacent to the spatial location of the first prediction unit in the upper layer depth; or
obtaining the optimal reference frames of the prediction unit having a spatial location equal to the spatial location of the first prediction unit in the upper layer depth and/or the respective one or more optimal reference frames of the one or more prediction units having spatial locations adjacent to the spatial location of the first prediction unit in the upper layer depth, and obtaining the optimal reference frames of the prediction units that are spatially adjacent to the first prediction unit; and
determining the optimal reference frame of the first prediction unit based further on correlations between optimal reference frames of prediction units having a same spatial location and/or spatial locations adjacent to each other in different layer depths.

5. The method of claim 4, wherein determining the optimal reference frame of the first prediction unit based on the correlations between the optimal reference frames of the prediction units having the same spatial location and/or spatial locations adjacent to each other in the different layer depths comprises determining the optimal reference frame of the first prediction unit from the obtained optimal reference frames according to a strategy that the optimal reference frames of the prediction units having the same spatial location and/or spatial locations adjacent to each other in the different layer depths are equal to each other.

6. The method of claim 4, wherein determining the optimal reference frame of the first prediction unit based on the correlations between the optimal reference frames of the prediction units having the same spatial location and/or spatial locations adjacent to each other in the different layer depths comprises:
determining whether the obtained optimal reference frames are equal to each other; or determining whether the obtained optimal reference frames are equal to each other, and determining whether a motion of the predication unit having a spatial location equal to the spatial location of the first prediction unit in the upper layer depth is not severe; and
determining the obtained optimal reference frames as the optimal reference frame of the current prediction unit in response to determining that the obtained optimal reference frames are equal to each other.

7. The method of claim 1, wherein obtaining the optimal reference frames of the plurality of prediction units that are spatially adjacent to the first prediction unit comprises:
obtaining an optimal reference frame of a prediction unit that is left adjacent to the first prediction unit and an optimal reference frame of a prediction unit that is upper adjacent to the first prediction unit;
obtaining the optimal reference frame of the prediction unit that is left adjacent to the first prediction unit, the optimal reference frame of the prediction unit that is upper adjacent to the first prediction unit and an optimal reference frame of a prediction unit that is upper-left adjacent to the first prediction unit;
obtaining the optimal reference frame of the prediction unit that is left adjacent to the first prediction unit, the optimal reference frame of the prediction unit that is upper adjacent to the first prediction unit and an optimal reference frame of a prediction unit that is upper-right adjacent to the first prediction unit; or
obtaining the optimal reference frame of the prediction unit that is left adjacent to the first prediction unit, the optimal reference frame of the prediction unit that is upper adjacent to the first prediction unit, the optimal reference frame of the prediction unit that is upper-left adjacent to the first prediction unit, and the optimal reference frame of the prediction unit that is upper-right adjacent to the first prediction unit.

8. An apparatus comprising:
one or more processors;
memory;
a first acquisition unit stored in the memory and executable by the one or more processors to obtain optimal reference frames of a plurality of prediction units that are spatially adjacent to a first prediction unit that is located in a minimum layer depth;
a first judgment sub-unit to determine whether the obtained optimal reference frames are equal to each other; and
a first determination unit stored in the memory and executable by the one or more processors to determine the obtained optimal reference frames as an optimal reference frame of the first prediction unit without performing an ergodic rate distortion cost calculation if the obtained optimal reference frames are determined to be equal to each other.

9. The apparatus of claim 8, wherein:
the first acquisition unit further obtains optimal reference frames of a second plurality of prediction units that are spatially adjacent to a second prediction unit that is not located in the minimum layer depth; and
the first determination unit further determines an optimal reference frame of the second prediction unit based on the correlation between the optimal reference frames of the spatially adjacent prediction units in a same layer depth.

10. The apparatus of claim 8, wherein the first determination unit determines the optimal reference frame of the first prediction unit from the obtained optimal reference frames according to a strategy that the optimal reference frames of the spatially adjacent prediction units in the same layer depth are equal.

11. The apparatus of claim 8, further comprising:
a second acquisition unit stored in the memory and executable by the one or more processors to obtain an optimal reference frame of a prediction unit having a spatial location equal to a spatial location of the first prediction unit in an upper layer depth and respective one or more optimal reference frames of one or more prediction units having spatial locations adjacent to the spatial location of the first prediction unit in the upper layer depth; and
a second determination unit stored in the memory and executable by the one or more processors to determine the optimal reference frame of the first prediction unit based on correlations between optimal reference frames of prediction units having a same spatial location and/or spatial locations adjacent to each other in different layer depths.

12. The apparatus of claim 11, wherein the second determination unit determines the optimal reference frame of the first prediction unit from the obtained optimal reference frames according to a strategy that the optimal reference frames of the prediction units having the same spatial location and/or spatial locations adjacent to each other in the different layer depths are equal to each other.

13. The apparatus of claim 11, wherein the second determination unit comprises:
a second judgment sub-unit to:
determine whether the obtained optimal reference frames are equal to each other or determine whether the obtained optimal reference frames are equal to each other and determine whether a motion of the predication unit having a spatial location equal to the spatial location of the first prediction unit in the upper layer depth is not severe, and
trigger a second determination sub-unit in response to determining that the obtained optimal reference frames are equal to each other and/or determining that the motion of the predication unit having a spatial location equal to the spatial location of the first prediction unit in the upper layer depth is not severe; and
the second determination sub-unit to determine the optimal reference frames that are equal to each other as the optimal reference frame of the first prediction unit.

14. The apparatus of claim 8, wherein the first acquisition unit obtains:
an optimal reference frame of a prediction unit that is left adjacent to the first prediction unit and an optimal reference frame of a prediction unit that is upper adjacent to the first prediction unit;

the optimal reference frame of the prediction unit that is left adjacent to the first prediction unit, the optimal reference frame of the prediction unit that is upper adjacent to the first prediction unit and an optimal reference frame of a prediction unit that is upper-left adjacent to the first prediction unit;
the optimal reference frame of the prediction unit that is left adjacent to the first prediction unit, the optimal reference frame of the prediction unit that is upper adjacent to the first prediction unit and an optimal reference frame of a prediction unit that is upper-right adjacent to the first prediction unit; or
the optimal reference frame of the prediction unit that is left adjacent to the first prediction unit, the optimal reference frame of the prediction unit that is upper adjacent to the first prediction unit, the optimal reference frame of the prediction unit that is upper-left adjacent to the first prediction unit, and the optimal reference frame of the prediction unit that is upper-right adjacent to the first prediction unit.

15. One or more non-transitory computer-readable media storing executable instructions that, when executed by one or more processors, cause the one or more processors to perform acts comprising:
obtaining optimal reference frames of a plurality of prediction units that are spatially adjacent to a first prediction unit that is located in a minimum layer depth;
determining whether the obtained optimal reference frames are equal to each other; and
determining the obtained optimal reference frames as an optimal reference frame of the first prediction unit without performing an ergodic rate distortion cost calculation if the obtained optimal reference frames are determined to be equal to each other.

16. The one or more non-transitory computer-readable media of claim 15, wherein determining the optimal reference frame of the first prediction unit comprises determining the optimal reference frame of the first prediction unit from the obtained optimal reference frames according to a strategy that the optimal reference frames of the spatially adjacent prediction units in a same layer depth are equal.

17. The one or more non-transitory computer-readable media of claim 15, the acts further comprising:
obtaining an optimal reference frame of a prediction unit having a spatial location equal to a spatial location of the first prediction unit in an upper layer depth and respective one or more optimal reference frames of one or more prediction units having spatial locations adjacent to the spatial location of the first prediction unit in the upper layer depth; or
obtaining the optimal reference frames of the prediction unit having a spatial location equal to the spatial location of the first prediction unit in the upper layer depth and/or the respective one or more optimal reference frames of the one or more prediction units having spatial locations adjacent to the spatial location of the first prediction unit in the upper layer depth, and obtaining the optimal reference frames of the prediction units that are spatially adjacent to the first prediction unit; and
determining the optimal reference frame of the first prediction unit based on correlations between optimal reference frames of prediction units having the same spatial location and/or spatial locations adjacent to each other in different layer depths.

* * * * *